United States Patent [19]

Howell

[11] 4,316,802
[45] Feb. 23, 1982

[54] FILTER

[75] Inventor: Michael E. Howell, Davis Junction, Ill.

[73] Assignee: Illinois Water Treatment Company, Rockford, Ill.

[21] Appl. No.: 202,268

[22] Filed: Oct. 30, 1980

[51] Int. Cl.³ .................................. B01D 35/02
[52] U.S. Cl. ................................. 210/95; 210/232; 210/442; 210/457
[58] Field of Search .............. 210/94, 95, 232, 442, 210/445, 450, 457

[56] References Cited

U.S. PATENT DOCUMENTS

| | | | |
|---|---|---|---|
| 738,088 | 9/1903 | Vauclain et al. | 210/447 |
| 852,584 | 5/1907 | Skinner | 210/435 |
| 872,338 | 12/1907 | Gold | 210/435 |
| 882,393 | 3/1908 | Kramer | 210/232 X |
| 983,352 | 2/1911 | Cox | 177/186 |
| 1,175,948 | 3/1916 | French | 210/304 |
| 1,223,299 | 4/1917 | Taylor | 210/452 |
| 1,273,656 | 7/1918 | Paget | 210/310 |
| 1,477,885 | 12/1923 | Lehmann | 210/94 |
| 1,511,726 | 10/1924 | Heinze | 210/94 |
| 2,162,043 | 6/1939 | Westlund et al. | 183/51 |
| 2,363,009 | 11/1944 | Lewis | 210/131 |
| 2,608,301 | 8/1952 | Graves et al. | 210/94 |
| 2,657,805 | 11/1953 | Palcer | 210/453 |
| 2,722,316 | 11/1955 | Goscilo | 210/165 |
| 2,935,194 | 5/1960 | Tomkin | 210/95 |
| 3,006,470 | 10/1961 | Mueller | 210/356 |
| 3,179,253 | 4/1965 | McNeal | 210/315 |
| 3,286,838 | 11/1966 | Jones | 210/95 |
| 3,369,665 | 2/1968 | Paulson | 210/232 X |
| 3,552,552 | 1/1971 | Johnston | 210/447 |
| 3,633,752 | 1/1972 | Kurpgeweit | 210/232 X |
| 3,681,562 | 8/1972 | Winzen | 210/451 |
| 3,707,987 | 1/1973 | Gordon | 137/543 |
| 3,735,874 | 5/1973 | Steinman | 210/430 |
| 3,970,566 | 7/1976 | Rosaen | 210/452 |
| 4,009,109 | 2/1977 | Tullier et al. | 210/447 |
| 4,051,042 | 9/1977 | Tullier et al. | 210/409 |
| 4,124,511 | 11/1978 | Lay | 210/447 |
| 4,164,048 | 8/1979 | Kampfer et al. | 4/292 |

FOREIGN PATENT DOCUMENTS 1121069 1/1962 Fed. Rep. of Germany.

OTHER PUBLICATIONS

Schutte & Koerting Co., Drawing No. 76E-X087V.
Schutte & Koerting Co., pp. 7, 9, 12, 14, and 15 of Bulletin 9-s.
Mueller Steam Specialty, p. 12 of unidentified publication.
Fabricated Services, Inc., Bulletin Core TA, 5-75.
Fabricated Services, Inc., Bulletin Core TS, 5-75.
Weamco, Bulletin ST474.
Winston Manufacturing Corporation, Bulletin No. 777-STR.
P. 4 of unidentified publication, Dow Tubular Sight Flow.
Illinois Water Treatment Co., Drawing No. E-4.19B-6.

Primary Examiner—John Adee
Attorney, Agent, or Firm—George R. Clark; Neil M. Rose; Allen J. Hoover

[57] ABSTRACT

A filter, which may be used to filter particles of resin as well as protect against sudden loss of resin from an effluent discharged from an ion-exchange column, a first plate mounted between a flanged end of a first branch and a flanged end of a pipe, a second plate mounted between a blind flange and a flanged end of a second branch, and a perforated tube fitted through said branches so as to leave an annular space around the perforated tube. A first end of the perforated tube is threaded into a threaded aperture in the first plate to provide for manufacturing tolerances. A second end of the perforated tube is received by an annular groove on one face of the second plate to provide for a particle-tight seal, and the annular groove circumscribes a larger aperture in the second plate. A flanged end of a third branch is mounted to a flanged end of another pipe. A transparent sight may be provided at a fourth branch.

10 Claims, 4 Drawing Figures

FILTER

BACKGROUND OF THE INVENTION

1. Field of the Invention

This invention pertains to a filter, which may be used to filter particles of ion-exchange resin from an effluent discharged from an ion-exchange column, or for other purposes.

2. Brief Description of Prior Art

As exemplified in U.S. Pat. No. 3,006,478, U.S. Pat. No. 3,179,253, U.S. Pat. No. 3,552,552, U.S. Pat. No. 3,735,874, U.S. Pat. No. 3,970,566, U.S. Pat. No. 4,009,109, U.S. Pat. No. 4,051,042, U.S. Pat. No. 4,124,511, and U.S. Pat. No. 4,164,048, it is known for a device of similar character to comprise a hollow body, which may be a tee combined with an extension pipe connected to the tee, which in turn is connected in a pipeline. A filtering element, which is mounted within the body and the extension pipe, can be removed from the body and the extension pipe while the body and the extension pipe remain connected in the pipeline. In U.S. Pat. No. 3,970,566, a standard or conventional tee having respective threaded ends is disclosed.

Older references of related interest include U.S. Pat. No. 738,088, U.S. Pat. No. 852,584, U.S. Pat. No. 872,338, U.S. Pat. No. 983,352, U.S. Pat. No. 1,175,948, U.S. Pat. No. 1,223,299, U.S. Pat. No. 1,477,885, U.S. Pat. No. 1,511,726, U.S. Pat. No. 2,162,043, U.S. Pat. No. 2,363,009, U.S. Pat. No. 2,608,301, U.S. Pat. No. 2,657,805, and U.S. Pat. No. 2,722,316.

As exemplified in German Auslegeschrift No. 1,121,069, it is known for a device of similar character to be provided with transparent sights, which allow visual inspection of a fluid passing through the device. U.S. Pat. No. 2,935,194 and U.S. Pat. No. 3,681,562 disclose other devices having transparent sights for similar purposes.

As a matter of additional background and prior art, it is known for a filtering element to comprise a tube having a perforated portion, a screen having a smaller mesh and covering the perforated portion of the tube, and a strand being wound closely around the screen and cemented to the tube at each end of the screen.

Herein, except as required in a particular context, all references to tees are intended to refer not only to tees having orthogonal axes but also to laterals having oblique axes, crosses having similar orthogonal or oblique axes, and parts of similar character, such as side-outlet tees.

SUMMARY OF THE INVENTION

This invention provides a filter of an improved type to be used with a pipe having a flanged end. As mentioned above, the filter may be used to filter particles of ion-exchange resin from a fluid discharged from an ion-exchange column, or for other purposes.

The filter comprises a hollow body, which includes first, second, and third tubular branches having coplanar axes. The first and second branches have respective flanged ends. The axes of the first and second branches are coincident. The flanged end of the first branch is adapted to be mounted to the flanged end of the pipe.

The filter comprises a blind flange, which is mounted on the flanged end of the second branch, a first plate, which is adapted to be mounted between the flanged end of the first branch and the flanged end of the pipe, and which has an aperture circumscribed on one face of said other plate by an annular groove, and a second plate, which is mounted between the blind flange and the flanged end of the second branch, and which has a threaded aperture.

The filter also comprises a tubular filtering element, which is fitted through the first and second branches so as to leave an annular space around the filtering element, which has a first end received by the annular groove of the second plate, and a second end, which is threaded into the threaded aperture of the first plate.

Thereby, the threaded aperture compensates for dimensional tolerances, so as to enable a particle-tight seal to be effected between the first end of the filtering element and the annular groove. Also, when the flanged end of the first branch is mounted to the flanged end of the pipe, an effluent entering the filter through the third branch passes into the filtering element and from one end of the filtering element into the pipe, and particles removed from the effluent by the filter accumulate in the annular space around the filtering element, between the plates. Also, the blind flange, the second plate, and the filtering element can be removed from the filter at the flanged end of the second branch while the flanged end of the pipe and the first plate remain mounted to the flanged end of the first branch. It is to be understood that the pipe may be a tubular portion of a pipe fitting, an existing pipe in a pipeline, or another suitable pipe.

Preferably, the third branch has a flanged end, which is adapted to be mounted to the flanged end of another pipe. Preferably, the axis of the third branch is normal to the axes of the first and second branches. Accordingly, a conventional tee having respective flanged ends may be used, without any need for welding, cutting, or machining of the tee. Preferably, the hollow body includes a fourth branch having a flanged end, wherein the fourth branch has an axis intersecting the axes of the first and second branches. Accordingly, the filter may comprise an annular flange, which is mounted to the flanged end of the fourth branch, and a transparent sight, which is mounted between the annular flange and the flanged end of the fourth branch, so as to allow visual inspection of the effluent and accumulated particles in the annular space around the filtering element. Preferably, the axis of the fourth branch is normal to the axes of the first and second branches and normal to the axis of the third branch, and the axis of the third branch intersects the axes of the first and second branches where the axis of the fourth branch intersects the first and second branches. Alternatively, the axis of the fourth branch may be coincident with the axis of the third branch.

These and other objects, features, and advantages of this invention will be evident from the following description of a preferred embodiment of this invention, with reference to the accompanying drawings.

BRIEF DESCRIPTION OF THE DRAWINGS

In FIG. 3, an intermediate portion of the outer strand is omitted, so as to expose the tubular screen beneath the outer strand. The filtering element also is visible through a transparent sight in FIG. 1, in which the outer strand is omitted entirely and the tubular screen is shown fragmentarily, so as to expose the perforated tube beneath the tubular screen.

DETAILED DESCRIPTION OF PREFERRED EMBODIMENT

Figure 1:
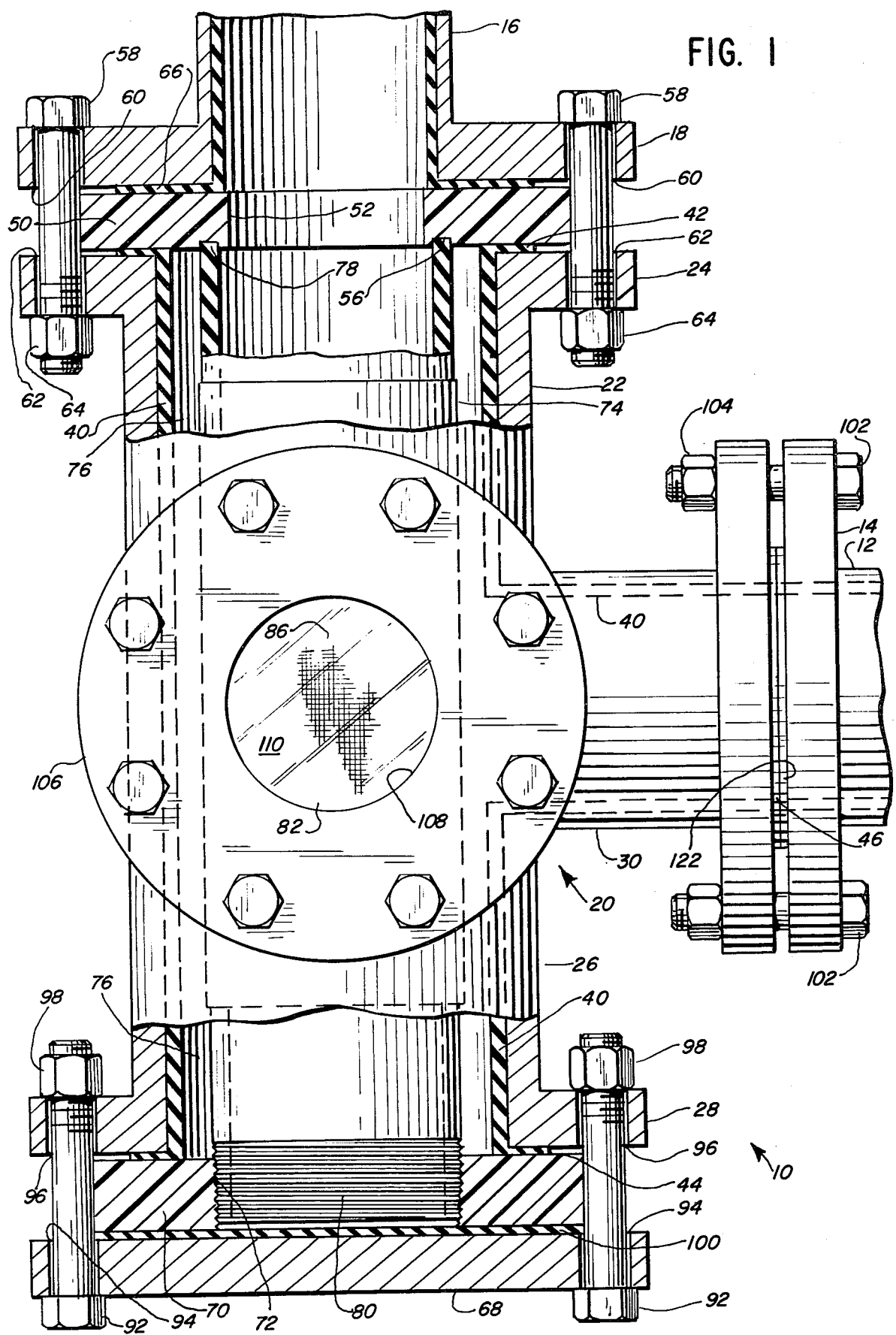
FIG. 1 is an elevational view of a filter constituting a preferred embodiment of this invention. Certain portions of the filter appear in vertical half-section in FIG. 1.
Figure 2:
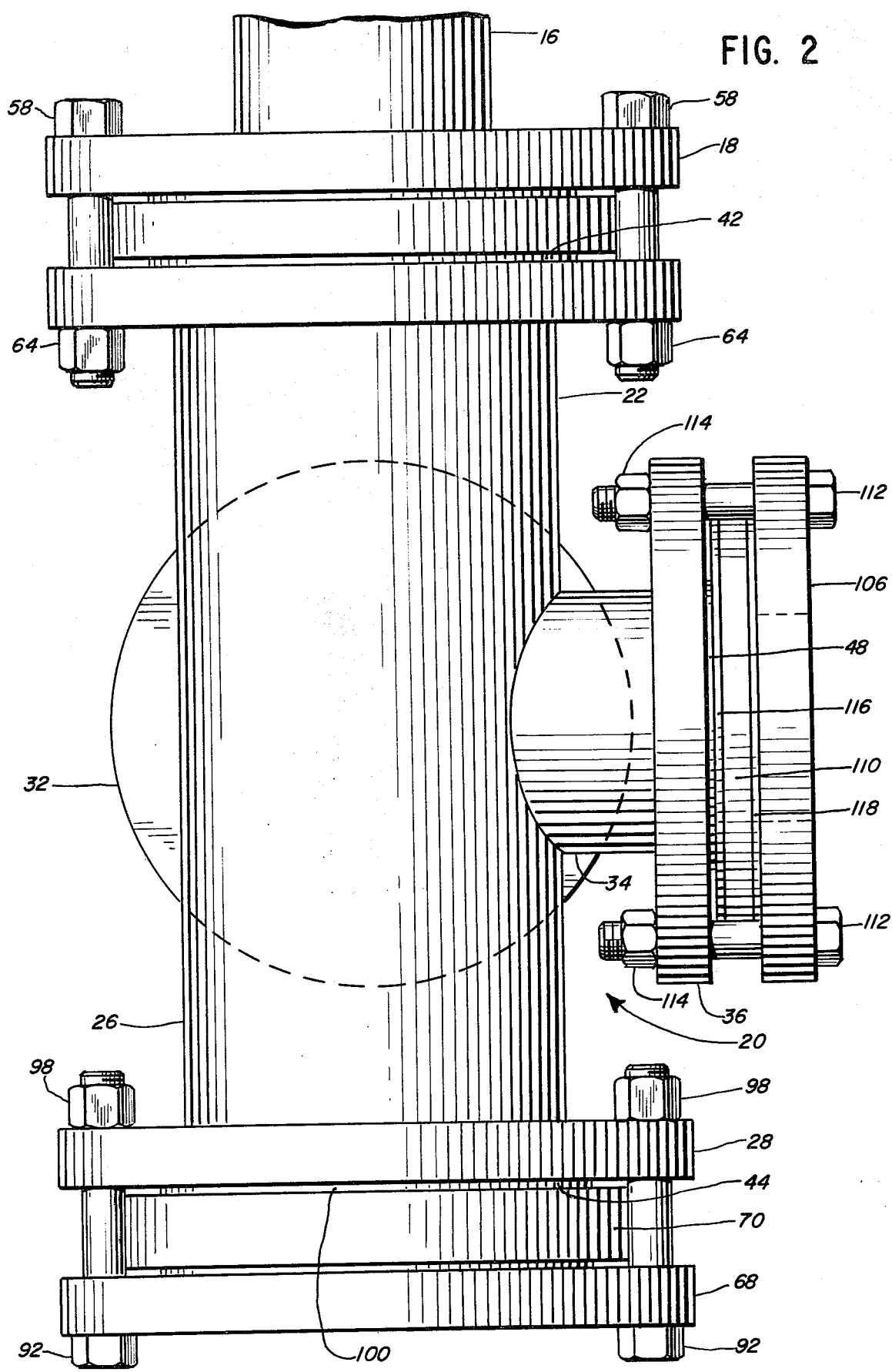
FIG. 2 is an elevational view taken along line 2—2 of FIG. 1.

As shown in the drawings, a filter 10 constituting a preferred embodiment of this invention may be used to filter particles of resin from an effluent discharged from an ion-exchange column, as in a sugar refinery. As shown in FIGS. 1 and 2, the filter 10 is connected in a pipeline comprising a pipe 12, which has a flanged end 14, and a pipe 16, which has a flanged end 18. The pipe 12 may be arranged to conduct an effluent, which may be a sugar solution in a sugar refinery, from an ion-exchange column or other source (not shown) to the filter 10. The pipe 16 may be arranged to conduct the effluent to another ion-exchange column or receiver (not shown) from the filter 10. As shown in FIGS. 1 and 2, the pipe 16 conducts the effluent upwardly from the filter 10, so as to avoid recontamination of the effluent (by particles filtered from the effluent by the filter 10) when the filter 10 is disassembled in a manner described below.

The filter 10 comprises a hollow body 20, which may be made of any suitable metal used in piping, and which has respective tubular branches including a first branch 22, which has a flanged end 24, a second branch 26, which has a flanged end 28, and a third branch 30, which has a flanged end 32. The axes of the first branch 22, the second branch 26, and the third branch 30 are coplanar. The first branch 22 and the second branch 26 have coincident axes. The axis of the third branch 30 is normal to the axes of the first branch 22 and the second branch 26. Also, the hollow body 20 has a fourth branch 34, which has a flanged end 36. The axis of the fourth branch 34 intersects the axes of the first branch 22 and the second branch 26 where the axis of the third branch 30 intersects the axes of the first branch 22 and the second branch 26. Preferably, as shown, the axis of the fourth branch 34 is normal to the axes of the first branch 22 and the second branch 26 and to the axis of the third branch 30. Alternatively, the axis of the fourth branch 34 may be coincident with the axis of the third branch 30. Preferably, the hollow body 20 accords with ANSI Specification B-16.5, which deals with crosses, tees, etc., for dimensional conformance.

The hollow body 20 is provided conventionally with a liner 40, which may be molded of suitable elastomeric material, as exemplified by white neoprene of a grade suitable for contact with food. The liner 40 has an annular extension 42, which serves as an annular gasket at the flanged end 24 of the first branch 22, an annular extension 44, which serves as an annular gasket at the flanged end 28 of the second branch 26, an annular extension 46, which serves as an annular gasket at the flanged end 32 of the third branch 30, and an annular extension 48, which serves as an annular gasket at the flanged end 36 of the fourth branch 34.

The filter 10 comprises a first plate 50, which may be made of high-density polyethylene, and which has an aperture 52 bored through the first plate 50 and a circumscribed annular groove 56 on one face 54 of the first plate 50, providing a particle-tight seating surface for the perforated tube 74 at the first end 78. The flanged end 24 of the first branch 22 is mounted to the flanged end 18 of the pipe 16, so as to mount the first plate 50 between the flanged end 24 and the flanged end 18 of the pipe 16, by conventional hex-bolts 58 passing through suitable apertures 60 in the flanged end 18 of the pipe 16, outside the first plate 50, and through suitable apertures 62 in the flanged end 24, and receiving conventional hex-nuts 64. The annular extension 42 of the liner 40 is interposed between the flanged end 24 and the first plate 50. An annular gasket 66, which may be made of similar elastomeric material, is interposed between the flanged end 18 of the pipe 16 and the first plate 50. The annular gasket 66 is an integral part of a similar liner for the pipe 16.

The filter 10 comprises a blind flange 68, which is mounted on the flanged end 28 of the second branch 26, a second plate 70, which may be made of high-density polyethylene, and which has a threaded aperture 72, in order to compensate for tolerances encountered with the length of the hollow body 20, so as to provide a particle-tight seat at the mating of the annular groove 56 of the first plate 50 and the perforated tube 74 at the first end 78, and a perforated tube 74, which is fitted through the first branch 22 and the second branch 26, so as to leave an annular space 76 around the perforated tube 74. The perforated tube 74, which may be made of chlorinated polyvinyl chloride, has a first end 78, which is received by the annular groove 56, a second end 80, which is threaded into the threaded aperture 72 of the second plate 70, and a perforated portion 82 between the first end 78 and the second end 80.

Figure 3:
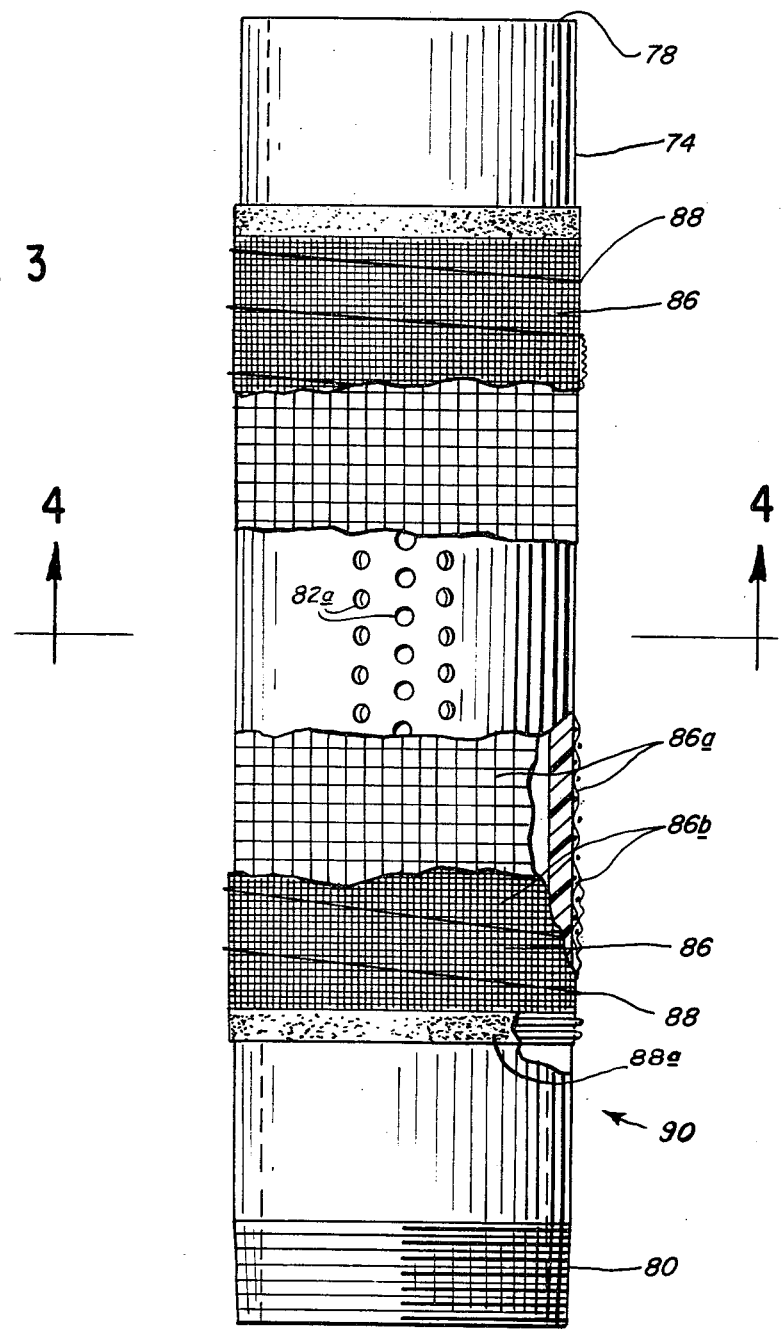
FIG. 3 is an elevational view of a filtering element used in the filter of FIGS. 1 and 2. The filtering element includes a perforated tube, a tubular screen, and an outer strand.
Figure 4:
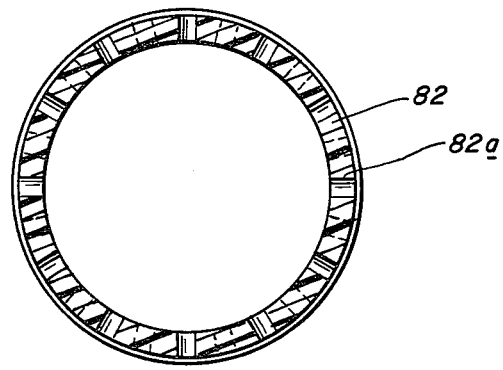
FIG. 4 is a section taken along line 4—4 of FIG. 3.

Preferably, the perforated portion 82 of the perforated tube 74 has rows of holes 82a arrayed around the perimeter of the perforated tube 74 and spaced equally, and the holes 82a are sized according to the required flow rate of the effluent through the pipeline. As shown in FIG. 3, the perforated portion 82 of the perforated tube 74 is covered by a double tubular screen 86 having a smaller mesh wrapped over a coarser mesh and having sewn seams. The tubular screen 86 may be woven of strands of polypropylene. Preferably, the tubular screen 86 has openings sized at 50 U.S. Mesh for the outer layer 86b and 20 U.S. Mesh for the inner layer 86a. As shown in FIG. 3, an outer strand 88, which may be made of polytetrafluorethylene fiber, is wound closely around the tubular screen 86 and tied at each end of the tubular screen 86. The outer strand 88 is tied and cemented to the perforated tube 74, at each end of the tubular screen 86, chlorinated polyvinyl chloride cement 88a being used. The perforated tube 74, the tubular screen 86, and the outer strand 88 constitute a filtering element 90.

The blind flange 68 is mounted to the flanged end 28 of the second branch 26, so as to mount the second plate 70 between the blind flange 68 and the flanged end 28, and so as to secure the filtering element 90 within the hollow body 20 by conventional hex-bolts 92 passing through suitable apertures 94 in the blind flange 68, outside the second plate 70, and through suitable apertures 96 in the flanged end 28, and receiving conventional hex-nuts 98. The annular extension 44 of the liner 40 is interposed between the flanged end 28 and the second plate 70. An annular blind-flange gasket 100, which may be made of similar elastomeric material, is interposed between the blind flange 68 and the second plate 70.

The flanged end 32 of the third branch 30 is mounted to the flanged end 14 of the pipe 12 by conventional hex-bolts 102 passing through suitable apertures (not shown) in the flanged end 14, and through suitable apertures (not shown) in the flanged end 32, and receiving conventional hex-nuts 104. The annular extension 46 of the liner 40 and an annular gasket 122 forming an integral part of a similar liner for the pipe 12 are interposed between the flanged end 14 and the flanged end 32.

The filter 10 comprises an annular flange 106, which has a central aperture 108, and a transparent sight 110, which may be made of transparent polycarbonate. The annular flange 106 is mounted to the flanged end 36 of the fourth branch 34, so as to mount the transparent sight 110 between the annular flange 106 and the flanged end 36, by conventional hex-bolts 112 passing through suitable apertures (not shown) in the annular flange 106, outside the transparent sight 110, and through suitable apertures (not shown) in the flanged end 36, and receiving conventional hex-nuts 114. The annular extension 48 of the liner 40 and an annular gasket 116, which may be made of similar elastomeric material, are interposed between the flanged end 36 and the transparent sight 110. A similar gasket 118 is interposed between the transparent sight 110 and the annular flange 106. The transparent sight 110 allows visual inspection of the effluent in the annular space 76.

Advantageously, the hollow body 20 can remain connected to the pipe 12 and to the pipe 16 when the filtering element 90 is removed through the second branch 26, along with the blind flange 68, the annular gasket 100, and the second plate 70, as for inspecting, cleaning, or replacing the filtering element 90, when the filtering element 90 thus is removed. As the flanged end 24 of the first branch 22 is disposed above the flanged end 28 of the second branch 26, particles filtered by the filtering element 90 and accumulated in the annular space 76 around the filtering element 90, between the first plate 50 and the second plate 70, cannot fall into the pipe 16 when the filtering element 90 thus is removed. When the filtering element 90 is mounted within the hollow body 20, it is sufficient for the first end 78 of the perforated tube 74 to be received in the annular groove 56 with a particle-tight fit, and it is unnecessary for it to be received with a fluid-tight fit.

In possible alternative embodiments of this invention, other angular orientations of the axis of the third branch 30 and the axis of the fourth branch 34 may be employed. As an example, the axis of the third branch 30 and the axis of the fourth branch 34 may be coincident with each other and normal to the axes of the first branch 22 and the second branch 26, whereupon a conventional cross having respective flanged ends may be used as the hollow body 20. If the fourth branch 34 is omitted, a conventional tee having respective flanged ends may be used as the hollow body 20. Whether a conventional cross or a conventional tee is used as the hollow body, there is no need for welding, cutting, or machining of the hollow body. As shown and described above, the hollow body 20 is in the form of a conventional side-outlet tee, which again requires no modification for construction of the filter 10.

As used to filter particles of resin from an effluent discharged from an ion-exchange column, as in a sugar refinery, the filter 10 has another significant, advantageous function. The filter 10 would provide protection against sudden loss of ion-exchange resin with the effluent if there should be a failure of the internal effluent-collecting system of the ion-exchange column.

I claim:

1. To be used with a pipe having a flanged end, a filter comprising:
   (a) a hollow body, which includes first, second, and third tubular branches having coplanar axes, the first and second branches having respective flanged ends, the axes of the first and second branches being coincident, the flanged end of the first branch being adapted to be mounted to the flanged end of the pipe,
   (b) a blind flange, which is mounted on the flanged end of the second branch,
   (c) a first plate, which is adapted to be mounted between the flanged end of the first branch and the flanged end of the pipe, and which has an aperture circumscribed on one face of said other plate by an annular groove,
   (d) a second plate, which is mounted between the blind flange and the flanged end of the second branch, and which has a threaded aperture, and
   (e) a tubular filtering element, which is fitted through the first and second branches so as to leave an annular space around the filtering element, which has a first end received by the annular groove of the first plate and a second end threaded into the threaded aperture of the second plate, and which thus is retained by the blind flange, where the threaded aperture compensates for dimensional tolerances, so as to enable a particle-tight seal to be effected between the first end of the filtering element and the annular groove, whereby, when the flanged end of the first branch is mounted to the flanged end of the pipe, an effluent entering the filter through the third branch passes into the filtering element from the outside perimeter of the filtering element and from the first end of the filtering element into the pipe, and whereby particles removed from the effluent by the filter accumulate in the annular space around the filtering element, between the plates, and whereby the blind flange, the second plate, and the filtering element can be removed from the filter at the flanged end of the second branch while the flanged end of the pipe and the first plate remain mounted to the flanged end of the first branch.

2. The filter of claim 1 wherein the third branch has a flanged end, which is adapted to be mounted to a flanged end of another pipe.

3. The filter of claim 1 wherein the hollow body includes a fourth branch having a flanged end, wherein the fourth branch has an axis intersecting the axes of the first and second branches, and wherein the filter comprises:
   (f) an annular flange, which is mounted to the flanged end of the fourth branch, and
   (g) a transparent sight, which is mounted between the annular flange and the flanged end of the fourth branch so as to allow visual inspection of the effluent and accumulated particles in the annular space around the perforated tube.

4. The filter of claim 3 wherein the third branch has a flanged end, which is adapted to be mounted to a flanged end of another pipe.

5. The filter of any one of the preceding claims wherein the axis of the third branch is normal to the axes of the first and second branches.

6. The filter of claim 3 or 4 wherein the axis of the fourth branch is normal to the axes of the first and second branches.

7. The filter of claim 6 wherein the axis of the third branch is normal to the axes of the first and second branches.

8. The filter of claim 7 wherein the axis of the fourth branch is normal to the axis of the third branch.

9. The filter of claim 7 wherein the axis of the third branch intersects the axes of the first and second branches where the axis of the fourth branch intersects the axes of the first and second branches.

10. The filter of claim 9 wherein the axis of the fourth branch is normal to the axis of the third branch.

* * * * *